United States Patent
Wong

(10) Patent No.: US 9,418,094 B2
(45) Date of Patent: Aug. 16, 2016

(54) METHOD AND APPARATUS FOR PERFORMING MULTI-STAGE TABLE UPDATES

(75) Inventor: Daniel ManHung Wong, Sacramento, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1401 days.

(21) Appl. No.: 12/030,393

(22) Filed: Feb. 13, 2008

(65) Prior Publication Data

US 2009/0204570 A1 Aug. 13, 2009

(51) Int. Cl.
G06F 17/30 (2006.01)

(52) U.S. Cl.
CPC .... *G06F 17/30371* (2013.01); *G06F 17/30368* (2013.01); *G06F 17/30451* (2013.01)

(58) Field of Classification Search
CPC ................................................. G06F 17/30371
USPC ......... 707/642, 648, 669, 672, 673, 675, 679, 707/683, 684, 689, 691–698, 703, 708, 711, 707/727, 736, 737, 747, 751, 752, 759, 763, 707/773, 776, 779, 713–721, 767–770, 706, 707/722, 758, 765, 781, 999.002
See application file for complete search history.

(56) References Cited

U.S. PATENT DOCUMENTS

| | | | |
|---|---|---|---|
| 5,367,675 A * | 11/1994 | Cheng et al. | |
| 6,026,412 A * | 2/2000 | Sockut et al. | |
| 6,052,689 A * | 4/2000 | Muthukrishnan et al. | |
| 6,351,753 B1 * | 2/2002 | Jagadish et al. | |
| 6,457,020 B1 * | 9/2002 | Carey et al. | |
| 6,591,266 B1 * | 7/2003 | Li et al. | |
| 6,957,210 B1 * | 10/2005 | Ramesh | 707/745 |
| 2001/0049685 A1 * | 12/2001 | Carey et al. | 707/103 R |
| 2003/0093408 A1 * | 5/2003 | Brown et al. | 707/2 |
| 2004/0083347 A1 * | 4/2004 | Parson | 711/165 |
| 2004/0117358 A1 * | 6/2004 | von Kaenel et al. | 707/3 |
| 2004/0186920 A1 * | 9/2004 | Birdwell et al. | 710/1 |
| 2007/0143248 A1 * | 6/2007 | Uppala | 707/2 |
| 2008/0077566 A1 * | 3/2008 | Fell et al. | 707/4 |
| 2008/0155545 A1 * | 6/2008 | Mignet et al. | 718/102 |
| 2009/0307275 A1 * | 12/2009 | Miyashita et al. | 707/202 |

* cited by examiner

*Primary Examiner* — Syling Yen
(74) *Attorney, Agent, or Firm* — Shun Yao; Park, Vaughan, Fleming & Dowler LLP

(57) ABSTRACT

One embodiment of the present invention provides a system that facilitates performing multi-stage table updates. During operation, the system receives a query at a query processor, wherein executing the query causes an update to an entire table in a database. Next, the system estimates an amount of transaction log space required to execute the query. If the amount of transaction log space is greater than a pre-determined threshold, the system splits the query into a set of sub-queries, wherein an amount of transaction log space required by each sub-query in the set of sub-queries is less than the pre-determined threshold. For each sub-query in the set of sub-queries, the system executes the sub-query, and performs a mini-commit operation for the sub-query, wherein updates which comprise the mini-commit operation are not exposed to a user. Finally, when mini-commit operations have been performed for all of the sub-queries, the system performs a commit operation for the query.

18 Claims, 3 Drawing Sheets

COMPUTING ENVIRONMENT 100

METHOD AND APPARATUS FOR PERFORMING MULTI-STAGE TABLE UPDATES

BACKGROUND

1. Field of the Invention

The present invention relates to databases. More specifically, the present invention relates to a method and an apparatus for performing multi-stage table updates.

2. Related Art

Many organizations store vast amounts of data in database systems. In order to effectively maintain the integrity of the stored data, many of these databases adhere to a transaction model. As queries are performed against these databases, the manipulation of the data by the query is not visible to the outside world until the transaction encompassing the queries is committed. This allows any data manipulated during the transaction to be rolled-back to the original state if any of the queries fail.

In order to implement these transactions, transactional databases typically require a large amount of space dedicated to transaction logs. These transaction logs may reside in memory or in temporary storage until the transaction is committed. When the transaction is committed the changes in the transaction log are committed to the corresponding datafile. In the case of table-wide updates to large tables, the volume of temporary transaction logs may take up huge amount of memory or disk space.

SUMMARY

One embodiment of the present invention provides a system that facilitates performing multi-stage table updates. During operation, the system receives a query at a query processor, wherein executing the query causes an update to an entire table in a database. Next, the system estimates an amount of transaction log space required to execute the query. If the amount of transaction log space is greater than a pre-determined threshold, the system splits the query into a set of sub-queries, wherein an amount of transaction log space required by each sub-query in the set of sub-queries is less than the pre-determined threshold. For each sub-query in the set of sub-queries, the system executes the sub-query, and performs a mini-commit operation for the sub-query, wherein updates which comprise the mini-commit operation are not exposed to a user. Finally, when mini-commit operations have been performed for all of the sub-queries, the system performs a commit operation for the query.

In some embodiments of the present invention, estimating the amount of transaction log space required to execute the transaction involves estimating a number of rows affected by the query.

In some embodiments of the present invention, estimating the number of rows affected by the query can involve at least one of: determining a total number of rows in the table; analyzing a selectivity histogram from a query optimizer to determine an approximate number of rows affected by the query; and determining a total number of rows in a table partition if the table partition is specified in the query.

In some embodiments of the present invention, the system splits the query into a subset of queries by determining that a hash index exists on the table. The system then determines ranges for the hash index that define subsets of the table for each sub-query.

In some embodiments of the present invention, if the table is split into a set of partitions, the system splits the query into the set of sub-queries by determining if a total number of rows in each partition in the set of partitions would cause a sub-query to exceed the pre-determined threshold of transaction log space. If not, the system uses the partition to process one sub-query in the set of sub-queries. However, if so, the system divides the partition into multiple subsets which do not cause a corresponding sub-query to exceed the pre-determined threshold of transaction log space.

In some embodiments of the present invention, the system splits the query into the set of sub-queries by selecting a column from the table and selecting data from the table by specifying a range of data for the column.

In some embodiments of the present invention, the system splits the query into the set of sub-queries by receiving a subset instruction from the user. The system then splits the query according to the subset instruction.

In some embodiments of the present invention, if one of the sub-queries fails, the system abandons the mini-commit operations. The system then indicates that the query failed.

In some embodiments of the present invention, prior to splitting the query into the set of sub-queries, the system translates the query into a "create table" query that, when executed, creates a new table rather than updating the existing table. Upon completing execution of the query, the system then replaces the table with the new table.

DETAILED DESCRIPTION

Figure 1:
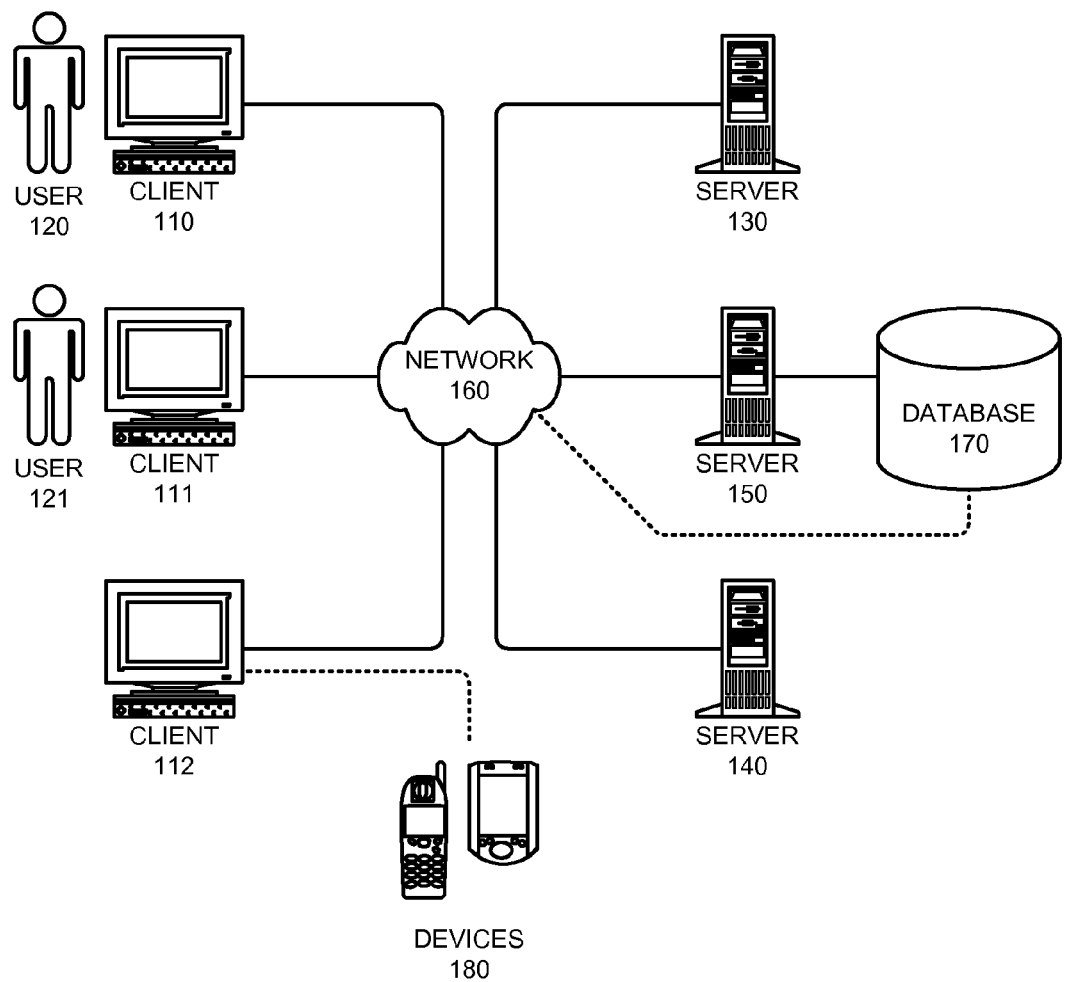
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

Embodiments of the present invention provide a system that auto-partitions a table when performing table-wide updates to avoid the cost of having to maintain large temporary transaction logs, and to avoid the significant overhead of having to "grow" an existing transaction log in real-time. The system analyzes impending updates by looking for: updates with no predicates, updates with predicates that are of low selectivities (they affect only a few rows in a table); updates with predicates that are of lower selectivities than a pre-determined threshold; and updates that include parameters for performing the auto-partition.

In some embodiments of the present invention, the system is mainly concerned with updates that have no predicates (they typically apply to an entire table rather than a few rows), and updates that have selectivities higher than a pre-determined threshold, because these updates will typically require a significant amount of transaction log space. If the system determines that the update is likely to require more transaction log space than is currently available, the system attempts to rewrite the update as a series of smaller updates that effect logical subsets of the data in the table. The server attempts to break the table into subsets based on the following criteria: if a hash index is defined; if partition(s) are defined, if primary key column(s) exist; and any other logical way to group rows. The system may also use various heuristics to split the data into subsets. For example, when there is a partition on the table, the system can update one partition at a time. In another example, when there is a sequence number column, the system can use ranges of the sequence. Furthermore, the system may identify rows that are sitting in the same block, and perform updates on a per-block basis.

In some embodiments, the newly rewritten update commands are issued instead of the original update command. Individual transactions for each command will perform conditional mini-commit operations on their own. Conditional mini-commit operations are the same as regular commit operations, except the data modified in the individual transactions will not be visible to other transactions until the final commit operation, which is performed after all mini-commit operations are completed successfully. The system maintains records of all of these mini-transactions for Atomicity, Consistency, Isolation, Durability (ACID) purposes. For recovery, rollback, or transaction commit purposes, these mini-transactions are either committed or not committed together in one final transaction.

Note that while the examples listed herein discuss queries as part of the Data Manipulation Language (DML), embodiments of the present invention work equally well with Data Definition Language (DDL) commands that result in table-wide updates.

For example, a DDL command to change a column encryption key would effect all of the rows in the table that comprises the column because data in each row would be read from the table, decrypted with the old key, encrypted with a new key, and then written back to the table. In some embodiments of the present invention, since the system breaks the table-wide update until multiple smaller updates, some of the data in the table would be encrypted under the old key while some of the data would be encrypted under the new key. In these embodiments, it may be necessary for the table to support multiple encryption keys for a single column. If the system allows access to this column while the key is being updated, and if a user queries data from this column while the update is being processed, the system can simply try one of the two keys to decrypt the data, and if the decryption is unsuccessful, the system can then try the other key.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, and devices 180.

Clients 110-112 can include any node on a network including computational capability and including a mechanism for communicating across the network.

Similarly, servers 130-150 can generally include any node on a network including a mechanism for servicing requests from a client for computational and/or data storage resources.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, Personal Digital Assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Note that different embodiments of the present invention may use different configurations, and are not limited to the configuration illustrated in computing environment 100. In some embodiments of the present invention, the system is comprised entirely within database 170, while in other embodiments of the present invention, the system is running on server 150, and is not within database 170.

Performing Multi-Stage Table Updates

Figure 2:
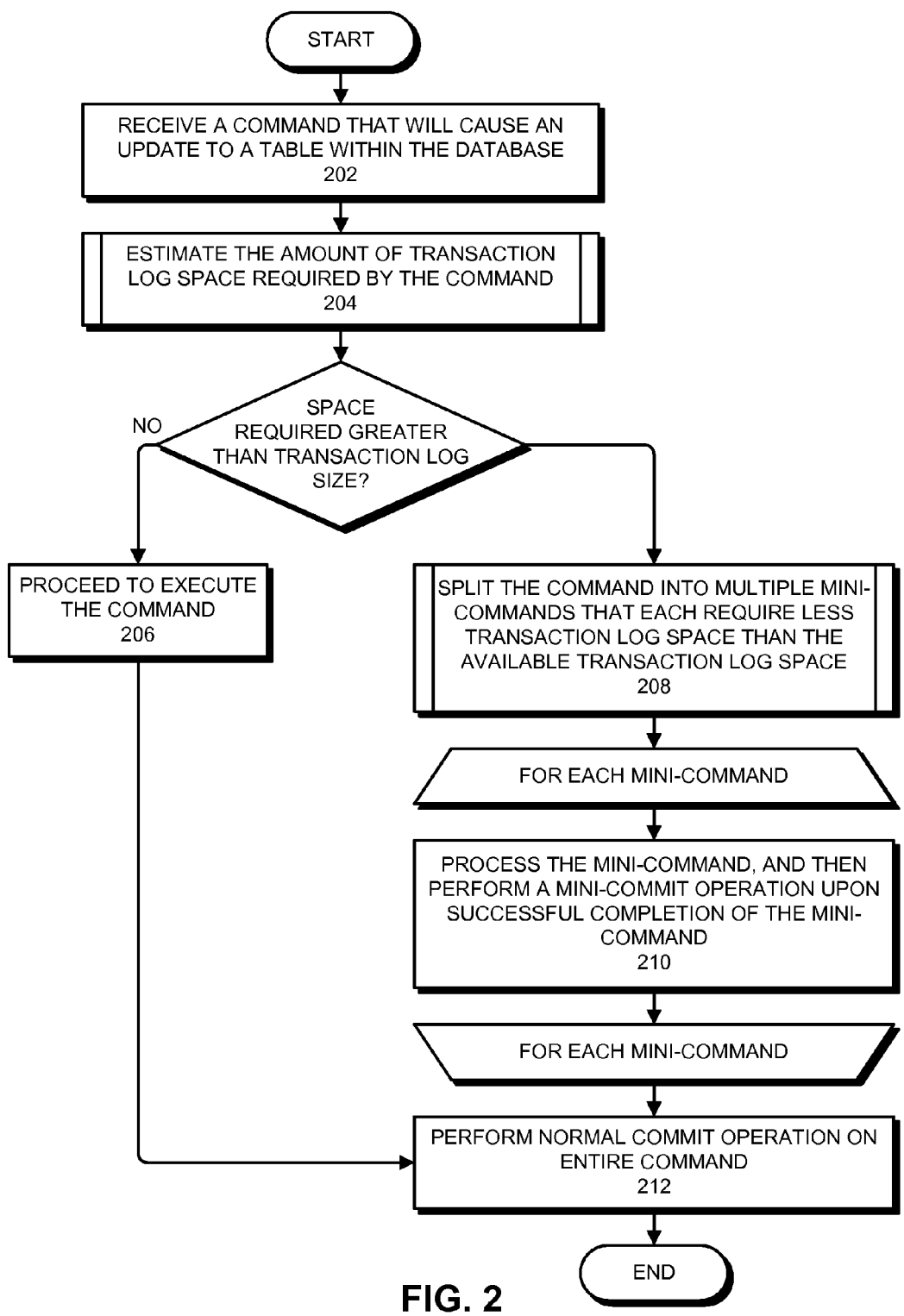
FIG. 2 presents a flowchart illustrating the process of performing multi-stage table updates in accordance with an embodiment of the present invention.

FIG. 2 presents a flowchart illustrating the process of performing multi-stage table updates in accordance with an embodiment of the present invention. During operation, the system receives a command that will cause an update to a table within database 170 (operation 202). Note that this command can be received from: a user, such as user 120; an application running on a client, such as client 110; from a server, such as server 150; from a database, such as database 170; or from any combination therein. As described previously, the command can be either a DML command, or a DDL command.

Next, the system estimates the amount of transaction log space required by the update command (operation 204). Note that this estimation is described in more detail in the description of FIG. 3, below. If the transaction log space required by the update command is not greater than the size of the transaction log, the system proceeds to execute the command (operation 206).

However, if the transaction log space required by the update command is greater than the size of the transaction log, the system splits the command into multiple mini-commands that each require less transaction log space than the available transaction log space (operation 208). Note this splitting the command into multiple mini-commands involves determining logical subsets of the data. This can be accomplished in many different ways as described previously.

For each mini-command, the system processes the mini-command, and then performs a mini-commit operation upon successful completion of the mini-command (operation 210). Finally, once all of the mini-commit operations have been performed, the system performs a normal commit operation on the entire command (operation 212). Note that in some embodiments of the present invention, at this time, the system marks the table update complete and exposes the new version of the table.

Note that in some embodiments of the present invention, in order to reduce complexity with modifying subsets of data in a large table that is frequently accessed, the system may alternatively write the data to a new table as the data is modified. Once all of the data is written to the new table, the system may delete the existing table and update all pointers to the new table.

In some embodiments of the present invention, the system utilizes standard two-phase commit architecture to perform the table updates. In these embodiments, each mini-command is implemented in a standard transaction, and all of these standard transactions are included in one master transaction. The master transaction is only committed if all of the standard transactions included in the master transaction commit. In these embodiments, the system leverages the existing transaction system in most database systems, and does not require a special transaction system for the mini-transactions.

Estimating an Amount of Transaction Log Space Required

Figure 3:
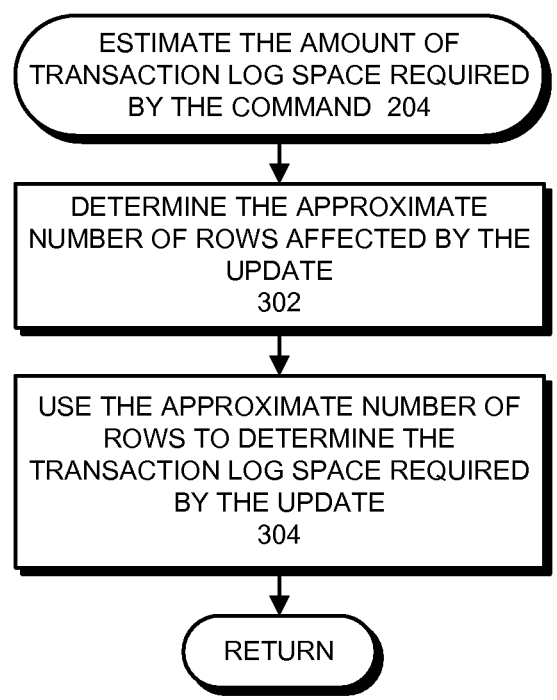
FIG. 3 presents a flowchart illustrating the process of estimating an amount of transaction log space required in accordance with an embodiment of the present invention.

FIG. 3 presents a flowchart illustrating the process of estimating an amount of required transaction log space in accordance with an embodiment of the present invention. During operation, the system determines the approximate number of rows affected by the update (operation 302). Note that this can be accomplished many different ways. In some embodiments of the present invention, the system may simply determine the number of rows in the entire table. In other embodiments, the system may analyze the selectivity histograms from the query optimizer. In some embodiments, if the table is partitioned, and only one partition is indicated in the update, the system may employ either of these techniques on the selected partition. In yet another embodiment, the system may receive hints indicating the space required from user 120, or from another system.

Once the approximate number of rows affected by the update has been determined, the system uses this information to determine the transaction log space required by the update (operation 304).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing database table updates, the method comprising:
receiving, by a computer, a query for updating a table in a database;
responsive to a storage space needed for storing a transaction log associated with the query exceeding a pre-determined threshold, dividing the query into a set of sub-queries by:
identifying partitions in the table; and
for each partition:
determining if a storage space needed for storing a transaction log associated with a sub-query corresponding to the partition exceeds the pre-determined threshold;
if not, processing the sub-query corresponding to the partition; and
if so, dividing the partition into multiple subsets such that a storage space needed for storing a transaction log associated with each sub-query corresponding to a subset is less than the pre-determined threshold.

2. The method of claim 1, further comprising estimating a number of rows in the table affected by the received query, and wherein estimating the number of rows affected by the query involves at least one of:
determining a total number of rows in the table;
analyzing a selectivity histogram from a query optimizer to determine an approximate number of rows affected by the query; and
determining a total number of rows in a table partition if the table partition is specified in the query.

3. The method of claim 1, wherein generating the subset of queries involves:
determining that a hash index exists on the table; and
determining ranges for the hash index that define subsets of the table for each sub-query.

4. The method of claim 1, wherein generating the set of sub-queries involves:
selecting a column from the table; and
selecting data from the table by specifying a range of data for the column.

5. The method of claim 1, wherein generating the set of sub-queries involves:
receiving a subset instruction from the user; and
splitting the query according to the subset instruction.

6. The method of claim 1, wherein prior to generating the set of sub-queries, the method involves:
translating the query into a "create table" query that, when executed, creates a new table rather than updating the existing table; and
upon completing execution of the "create table" query, replacing the existing table with the new table.

7. The method of claim 1, further comprising:
for each sub-query, performing a mini-commit operation;
responsive to mini-commit operations for all sub-queries being performed successfully, performing a commit operation for the received query; and
responsive to a mini-commit operation for any sub-query being performed unsuccessfully, rolling back the mini-commit operations for all sub-queries.

8. The method of claim 1, further comprising:
for each sub-query in the set of sub-queries:
executing the sub-query, and
performing a mini-commit operation for the sub-query, wherein updates which comprise the mini-commit operation are not exposed to a user; and
when mini-commit operations have been performed for all of the sub-queries, performing a commit operation for the query.

9. A non-transitory computer-readable storage medium storing instructions that when executed by a computer cause the computer to perform a method for performing multi-stage table updates, the method comprising:

receiving a query for updating a table in a database;

responsive to a storage space needed for storing a transaction log associated with the received query exceeding a pre-determined threshold, dividing the query into a set of sub-queries by:

identifying partitions in the table; and for each partition:

determining if a storage space needed for storing a transaction log associated with a sub-query corresponding to the partition exceeds the pre-determined threshold;

if not, processing the sub-query corresponding to the partition; and if so, dividing the partition into multiple subsets such that a storage space needed for storing a transaction log associated with each sub-query corresponding to a subset is less than the pre-determined threshold.

10. The non-transitory computer-readable storage medium of claim 9, wherein the method further comprising estimating a number of rows in the table affected by the received query, and wherein estimating the number of rows affected by the query involve at least one of:

determining a total number of rows in the table;

analyzing a selectivity histogram from a query optimizer to determine an approximate number of rows affected by the query; and determining a total number of rows in a table partition if the table partition is specified in the query.

11. The non-transitory computer-readable storage medium of claim 9, wherein generating the subset of queries involves:

determining that a hash index exists on the table; and determining ranges for the hash index that define subsets of the table for each sub-query.

12. The non-transitory computer-readable storage medium of claim 9, wherein generating the set of sub-queries involves:

selecting a column from the table; and selecting data from the table by specifying a range of data for the column.

13. The non-transitory computer-readable storage medium of claim 9, wherein generating the set of sub-queries involves:

receiving a subset instruction from the user; and splitting the query according to the subset instruction.

14. The non-transitory computer-readable storage medium of claim 9, wherein prior to generating the set of sub-queries, the method involves:

translating the query into a "create table" query that, when executed, creates a new table rather than updating the existing table; and upon completing execution of the "create table" query, replacing the existing table with the new table.

15. The non-transitory computer-readable storage medium of claim 9, wherein the method further comprises:

for each sub-query, performing a mini-commit operation;

responsive to mini-commit operations for all sub-queries being performed successfully, performing a commit operation for the received query; and responsive to a mini-commit operation for any sub-query being performed unsuccessfully, rolling back the mini-commit operations for all sub-queries.

16. An apparatus configured for performing multi-stage table updates, comprising:

a processor;

a receiving mechanism configured to receive a query at the processor for updating a table in a database;

a sub-query-generating mechanism configured to generate a set of sub-queries responsive to a storage space needed for storing a transaction log associated with the received query the pre-determined threshold, wherein while generating the sub-queries, the sub-query-generating mechanism is configured to:

identify partitions in the table; and for each partition:

determine if a storage space needed for storing a transaction log associated with a sub-query corresponding to the partition exceeds the pre-determined threshold;

if not, process the sub-query corresponding to the partition; and if so, divide the partition into multiple subsets such that a storage space needed for storing a transaction log associated with each sub-query corresponding to a subset is less than the pre-determined threshold.

17. The apparatus of claim 16, further comprising:

a translation mechanism configured to translate the query into a "create table" query that, when executed, creates a new table rather than updating the existing table; and a table replacement mechanism configured to replace the existing table with the new table upon completing execution of the "create table" query.

18. The apparatus of claim 16, further comprising:

a mini-commit mechanism configured to perform a mini-commit operation for each sub-query; and a commit mechanism configured to perform a commit operation for the received query in response to mini-commit operations for all sub-queries being performed successfully, and to roll back the mini-commit operations for all sub-queries in response to a mini-commit operation for any sub-query being performed unsuccessfully.

* * * * *